United States Patent [19]
Erickson

[11] 3,778,158
[45] Dec. 11, 1973

[54] ELECTRO-OPTIC DISPLACEMENT DEVICE
[75] Inventor: Kent E. Erickson, Brookside, N.J.
[73] Assignee: Keuffel & Esser Company, Morristown, N.J.
[22] Filed: Mar. 1, 1972
[21] Appl. No.: 230,758

[52] U.S. Cl.............. 356/28, 350/292, 350/299, 356/167
[51] Int. Cl.............. G01p 3/36, G02b 5/08
[58] Field of Search.............. 356/169, 170, 28, 356/167; 350/299; 250/237 G, 292

[56] References Cited
UNITED STATES PATENTS
3,344,700  10/1967  Brake................................ 356/169

Primary Examiner—Benjamin A. Borchelt
Assistant Examiner—S. C. Buczinski
Attorney—J. Russell Juten et al.

[57] ABSTRACT

A device for determining and measuring the direction and extent of displacement of a regularly divided linear or circular scale comprises means for illuminating the scale over a plurality of divisions and detector means for imaging the illuminated portion of the scale upon an image divider which directs corresponding portions of the scale image to different ones of a plurality of photo-electric cells. The light thus incident upon the various photocells represents an average over a number of scale rulings and regularly varies with displacement in phase-displaced relationship among the photocells to provide a plurality of signals which can be employed in a directional electronic counting device.

1 Claim, 8 Drawing Figures

ELECTRO-OPTIC DISPLACEMENT DEVICE

BACKGROUND

Numerous devices have been available for electro-optically sensing and determining the extent of movement of regularly graduated scales. These systems have been generally similar in that they comprise basically a source of illumination, a scale comprising essentially a regular series of optically distinct graduations, and photo-electric means for generating electrical signals useful in an electronic counter, such signals being representative of the interruption of illuminating light by the scale graduations with movement of the scale.

The simplest of such systems employs, for example, means of illumination which projects a narrow light beam equivalent in lateral dimension to the width of the graduations on the scale, in combination with a photo-electric detector having a field of view similarly limited in dimension. Movement of the scale thus provides a shuttering effect which can be regularly counted from the signal output of the photo-electric detector. Such systems are, of course, practically limited by the dimension of graduation width and are not significantly useful where it becomes desirable to obtain the measurement of smaller graduation displacements.

Improvement in the capability of measuring devices of this type to indicate smaller subdivisions of scale graduations has been obtained by the use of pairs of scale divisions or grating patterns to generate moire' fringes or fringe patterns from which photo-electric cells can generate fluctuating electrical signals. Systems of this type are well known and have been described, for example, in U.S. Pat. No. 3,454,777.

Variations in such systems have further increased the sensitivity of measurement, such as in the procedure of imaging a grating scale upon itself to provide the signal generating moire fringe pattern at the photocell detector. Refinements of this type improved the matching regularity in the pattern-forming gratings, and additionally improved the sensitivity of systems by effecting a counter-current movement between the primary and secondary grating patterns. Systems of this type have been described in U.S. Pat. Nos. 3,245,307 and 3,573,468.

These previous systems suffered, however, from inherent limitations and required compromises in use which severely restricted their versatility and effectiveness. The simplest line-by-line counting systems were for all practical purposes unidirectional; that is, they were incapable of distinguishing the direction of movement of the scale, since they utilized single detectors and thus merely counted the number of scale units displaced, regardless of the direction of displacement. An additional problem inherent in these simple systems derived from the fact that each of the individual scale graduations, or indicia, was viewed in turn by the photo-electric detector and thus, unless perfect repetition of indicia size and position was maintained, the output signals varied uncontrollably. Also, since an exposed scale in practical use is susceptible to abrasions and accumulated dirt, it was nearly impossible to insure the required regularity in scale graduations over a useful length of the scale.

The fringe-generating systems provided means for utilizing a plurality of detectors and thereby obtaining multiples of signal output which could be employed in directional displacement indicators. Even in such systems, however, there remained the disadvantage that distinctly different ones in the array of scale graduations were associated at a given time with each of the plurality of detectors. These systems, therefore, remained vulnerable to isolated indicia variations or marring of the scale. In an attempt to avoid this problem by distributing the light from a number of the scale indicia among the plurality of detectors, additional elements such as beamsplitters were introduced into the systems with the further disadvantageous results that efficiency of light utilization was reduced and the arrangements became more and more complex with the introduction of each new element. Not only were the requirements of perfection in both the manufacture and alignment of components made more extreme, but also there were practical limitations imposed upon the use of such systems, such as, for example, the limitation against use in conditions of vibration and shock. Since the moire fringe patterns may be displaced not only by movement in the direction of desired measurement, but also in other vector directions, rigid control of the positioning and stability of arrangement had to be maintained in order to provide a useful device.

SUMMARY

The displacement measuring system and arrangement of the present invention eliminates many of the disadvantages of prior systems and provides a compact, rugged and accurate means for generating a plurality of signals which may be employed in determining and indicating both direction and extent of minute movements.

The invention, in particular, provides a system which utilizes the simplicity and stability of design associated with the earliest-noted devices, yet includes means for distributing proportionate parts of the light of a plurality of scale periods among a number of photocells. By thus accumulating at each photocell like portions of light from a plurality of scale periods, the invention ensures that the influence on the light signal of any isolated error or mar in the scale becomes inconsequential, since such an error is submerged in the substantially greater accumulated light from the numerous other like parts of the scale.

The present invention allows the use of a scale which may be sufficiently coarse in its graduations to be readily produced by printing methods. Such a scale, depending upon its intended use, may take the form of a steel tape or other dimensionally stable carrier having a regular pattern of transverse rulings along its length. If desired, the carrier may be substantially transparent with the rulings being in the form of opaque areas. In use, the scale is attached to a work piece or other surface and displacements in the longitudinal direction of the scale, that is transverse to the rulings, are determined by the system.

An illumination module, including an incandescent lamp and a simple lens system, is arranged to project a beam of light upon the surface of the scale over a sufficient dimension to illuminate a plurality of the scale rulings. A second detection module comprises simple optics capable of imaging the illuminated portion of the scale at an image plane and, situated substantially at that image plane, an image divider.

Although this latter element will be hereafter described in greater detail, it is sufficient here to note that the element comprises a plurality of sections which are disposed in substantial alignment with the graduation pattern constituting the scale image, the sections being repeated transversely of the image graduations and having a fixed dimensional relationship with respect to the period of the image. Depending upon the selected lateral dimension of the sections, the dividing means separates each period of the image into a fixed plurality of segments. The proportion of light comprising each of the segments in any one image period varies with the relative positions of the scale and the dividing means; however, with respect to corresponding segments of the numerous periods of the image, each comprises an equal amount of light. In addition to effecting this scale image division, the element serves a further role of directing the light comprising corresponding segments of the scale image to respective ones of a plurality of photo-electric cells. In this manner there is accumulated at each respective photocell the same proportionate parts of the light constituting each segment of the recurring periods of the scale image. As noted, such accumulation renders innocuous any scale error residing in a single period segment.

As displacement occurs in a direction transverse to the scale graduations, that is, in the direction of periodicity of the scale, the image of the sclae at the image-dividing means moves across the face of that element in a direction transverse to the noted sections and different proportionate parts of the scale image are directed to the respective photocells with the result that the corresponding intensity of electrical signal output from each of the photocells varies in a quasi-sinusoidal pattern with regular displacement of the scale. Due to the fact that the sections of the image-dividing means recurr in a regular manner across the image plane, the respective patterns of output signal intensity from the various photocells, while retaining a general similarity in periodicity, are displaced in phase.

The electrical signals generated by the photocells in the present device may be readily employed in known electronic directional counting devices and a display may readily be provided which indicates the extent of movement of the scale image, hence the displacement of the scale. Such displays may be employed directly in distance measuring or may be incorporated further as control means for automatic tooling devices and the like.

DRAWINGS

DESCRIPTION

Figure 1:
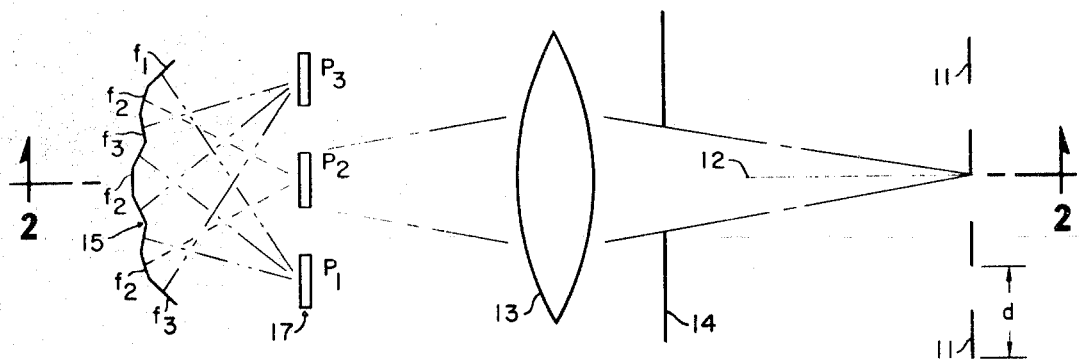
FIG. 1 is a schematic representation of the detection module a device according to the present invention, viewed in a plane perpendicular to the scale rulings; as at 1—1 of FIG. 2.

Scales employed in the present device may be readily prepared by printing or otherwise marking upon a desired carrier surface rulings or graduations of optically discernible material. Light-absorbing compositions or metallic deposits serve well in this regard. The rulings or scale indicia are disposed in a substantially parallel array along the length of a tape or, when it is desired to measure angular displacement, along the periphery of a circular disc. As shown in FIG. 1, each of the indicia 11 is of a pre-selected width and is separated from its neighboring indicia by a space of substantially equal width, thereby establishing a periodicity, $d$, along the extent of the array of indicia. Depending upon the ultimate use of the device, indicia 11 may be placed upon a carrier which is opaque, in which event illumination of the scale is effected at the same surface observed by the detection system. On the other hand, it may be desirable in some embodiments to illuminate the scale indicia from the side opposite that at which the detector is located, in which event the indicia may be carried upon a transparent base such as glass, plastic or the like.

Figure 2:
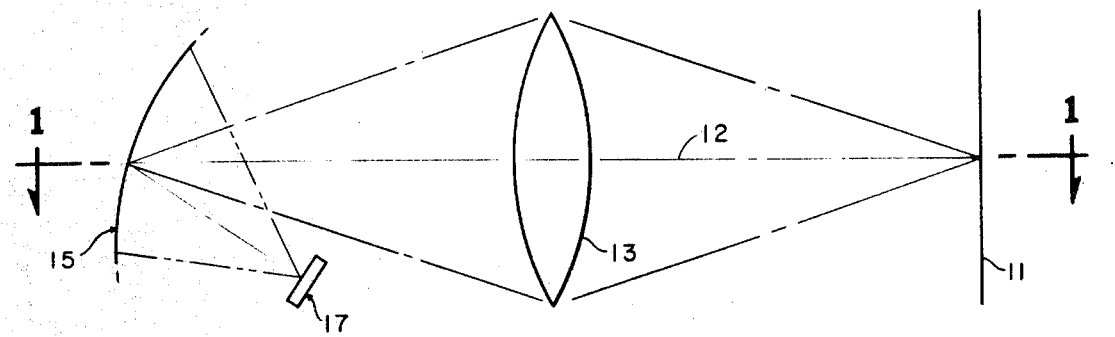
FIG. 2 is a schematic view of the detection module in a plane parallel to the scale rulings, as at 2—2 of FIG. 1.

A detection module of the present device, as shown in FIGS. 1 and 2, generally comprises optics 13 situated along the optical axis 12 of the module and of such dimensions as will image scale indicia 11 at an image plane, normally at nearly unit magnification. This degree of magnification is by no means critical and may be selected by the ultimate system designer without major restrictions. However, the unit magnification is sufficient to provide a mechanically simple and functionally reliable system.

Substantially at the image plane there is positioned an image divider 15 which serves to separate the image of scale indicia 11 into a series of segments running generally parallel to the direction of rulings, or indicia, 11. By virtue of the construction of the image divider, as will later be discussed in greater detail, the light of recurring ones of the various segments of the scale image are directed to different ones of a bank of photocells 17; for example, three such photocells $P_1$, $P_2$, and $P_3$, as shown in FIG. 1. Image divider 15 may additionally be employed to provide such further shift in the disposition of the optical axis of the module (as in FIG. 2) as may be desired in the selected mechanical design of the system.

The present invention may be applied to the use of any desired plurality of photocells; however, it has been found particularly useful to employ three such photocells. In this manner an effective balance of sensitivity and physical size is achieved, and the system is well adapted to the use of a reversible counter such as described in U.S. Pat. No. 3,271,676. The regular threefold division of the period of the scale image effects photocell signal outputs which are phase-varied, one from the other, by 120° and thus provides a useful combination of electronic signals which may be readily employed to achieve common mode elimination and obtain signals with more truly AC characteristics.

In the system schematically represented in FIGS. 1 and 2, image divider 15 comprises a generally spherical reflective surface which is of appropriate dimensions and disposition, as seen in FIG. 2, to focus the light comprising the scale image at photocell bank 17. The role of image divider may be accomplished by reflector 15 through the formation of a plurality of facets in the reflective surface. As shown in FIG. 1, the facet surfaces $f_1, f_2, f_3$ are longitudinally disposed with reference to indicia 11, that is, lie generally parallel to the length of indicia 11. Each facet surface is additionally individually situated at an angle with respect to its neighboring facets in such a manner that each set of three neighboring facets focuses scale image light in the direction of different ones of the plurality of the three photocells in bank 17. This arrangement of facet surface sets is continued across the face of divider 15 in any number of desired set repetitions.

It should be noted in general that the relative dimensions employed in the schematic representation of FIGS. 1 and 2 are by no means to scale and have been for the most part grossly exaggerated for purposes of clarity of discussion. Further, it will be understood that while the present description refers primarily to the use of reflecting surfaces as the facet elements in the image-dividing means, refractive elements may be similarly utilized. In such a latter construction the photocell bank would, of course, be situated on axis beyond the dividing means. Apparent also should be the fact that combinations of refractive and reflective element groups can be practically employed, if desired. Thus, for example, one or more of the respective elements in each facet set may be refractive with the remaining elements being reflective.

Figure 3:
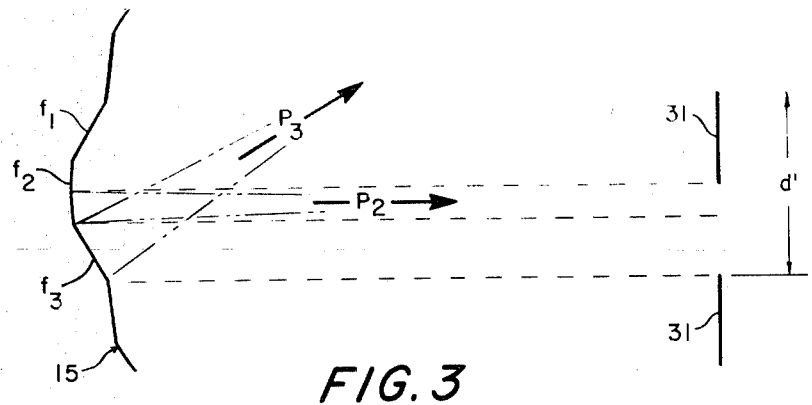
FIGS. 3 is a schematic representation of the division and light distribution of a portion of a scale image at a faceted reflective surface of an image divider.

The effect of each of the facet sets may be seen more clearly by reference to FIG. 3. One set of facet surfaces $f_1, f_2, f_3$ lie substantially at the image plane of scale image 31 which has a period, $d'$, of a preselected size relationship to scale period, $d$. As shown in FIG. 1, the optical system includes means 14 for limiting the aperture of lens 13 in order to achieve sufficient depth of focus to accommodate the slight actual curvature of surface 15, that is, to insure that scale image 31 will be substantially in focus over the effective width of surface 15, as well as to allow practical tolerance in positioning elements of the device. Again for the sake of pictorial clarity, scale image 31 (FIG. 3) has been displaced from the surface of divider 15, yet it should be noted that the relative lateral disposition of image 31 and the faceted surfaces for an arbitrarily preselected stationary position of the scale has been retained.

With a preferred lateral facet set dimension substantially equal to the period, $d'$, of the scale image, the light comprising the image of the space between image indicia 31, 31 falls upon the whole of facet $f_3$, upon one-half the width of facet $f_2$ and not all all upon facet $f_1$. As a result, facet $f_3$ focuses a unit of incident light in the direction of photocell $P_3$, facet $f_2$ focuses one-half as much light in the direction of photocell $P_2$, and facet $f_1$ reflects no light at all in the direction of photocell $P_1$. The outcome of the instant lateral relative disposition between surface 15 and the scale image is, therefore, that photocell $P_3$, $P_2$, and $P_1$ are respectively illuminated, and consequently provide output signals in the ratio of 2:1:0. It will thus become apparent that with a transverse shift in the location of the scale image at surface 15, as occasioned by a displacemtnt of the scale and indicia 11, more or less light is incident upon the facet series $f_1, f_2, f_3$ to be concurrently focused at photocells $P_1, P_2, P_3$.

Figure 4:
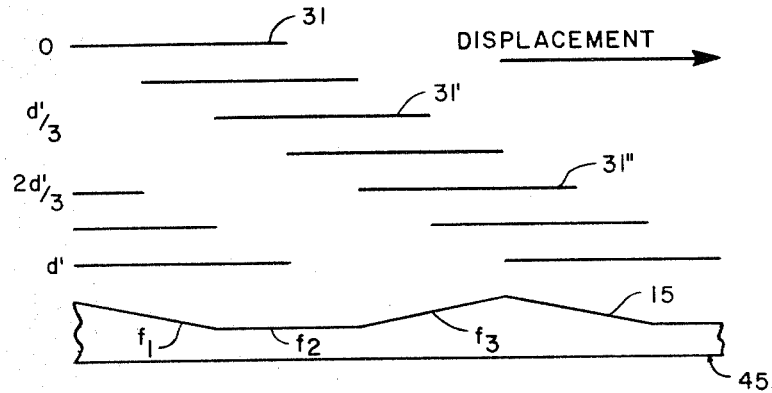
FIG. 4 is a schematic representation of the relative dispositions of portions of a scale image and faceted image divider surface during a periodic displacement cycle of the scale image.

The effect of the displacement of the scale can further be seen with reference to FIG. 4. With an initial relative lateral position, O, of indicia image 31 with respect to a facet set of a section 45 of the image divider similar to that shown in FIG. 3, light is incident only upon facets $f_2$ and $f_3$ and in the approximate ratio of 1:2. Considering displacement of the scale in a direction to effect downward movement of scale image 31 (FIG. 3), displacement of the image occurs in the indicated direction in FIG. 4. Upon such displacement of the scale image through one-third of the scale image period, $d'/3$, indicia image 31' now becomes aligned with the facet set of section 45 such that light is incident only upon facet $f_1$ and $f_3$ in a ratio of 2:1. Further displacement through two-thirds of a period, $2d'/3$, of the scale image results in displacement of indicia image to a position of 31'' with light being incident only upon facets $f_1$ and $f_2$ in the ratio of 1:2. Still further displacement through one complete image period, $d'$, concludes a displacement cycle with the respective facets $f_2$ and $f_3$ being lighted to the extent originally noted.

Figure 5:
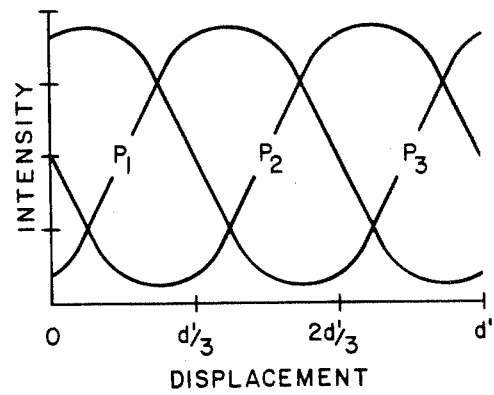
FIG. 5 is a representation of the patterns of electrical signal output from a plurality of photocells in an embodiment of the present invention.

Since light incident upon the respective facets $f_1, f_2, f_3$ of each of a plurality of sets on a surface 15 is directed to corresponding photocells $P_1, P_2, P_3$ with a resulting similar ratio of signal output from these photocells, a quasi-sinusoidal pattern of output signals from the photocells would appear with respect to each image displacement cycle, $d'$, as shown in FIG. 5. Utilizing each of the signals, phase-displaced by 120°, in an electronic counter described in U.S. Pat. No. 3,271,676 provides a means for determining the net actual displacement of the scale.

From the foregoing it can be seen that by virtue of the described construction of the image-divider, the invention accomplishes directly in this simple unitized element the separation and distribution of the scale image light in such a manner that each of numerous scale periods contributes to the total light signal incident upon each of the various photocells in the system, and thus eliminates the requirement for auxiliary beam-splitter elements which would otherwise necessitate complex assembly to ensure proper alignment and registration of individual scale-dividing grid elements.

PREFERRED EMBODIMENT

Figure 6:
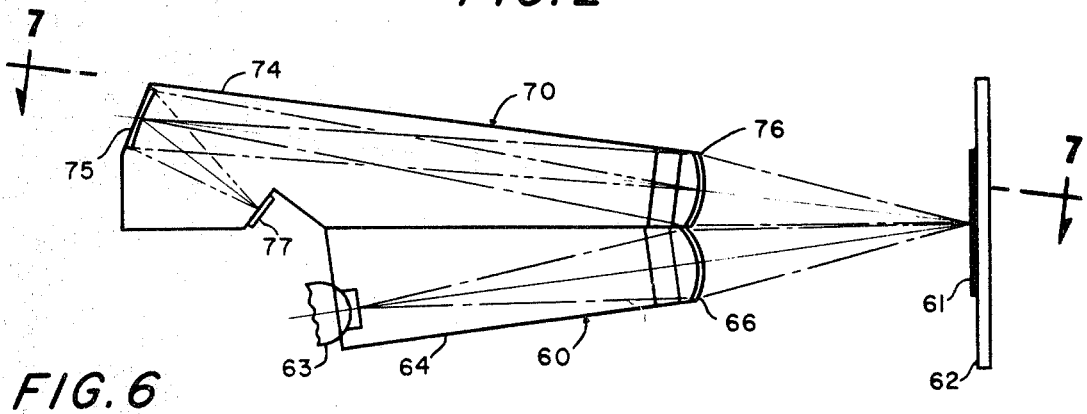
FIG. 6 is a representation of a preferred embodiment of the present invention as viewed in a plane parallel to scale rulings.
Figure 7:
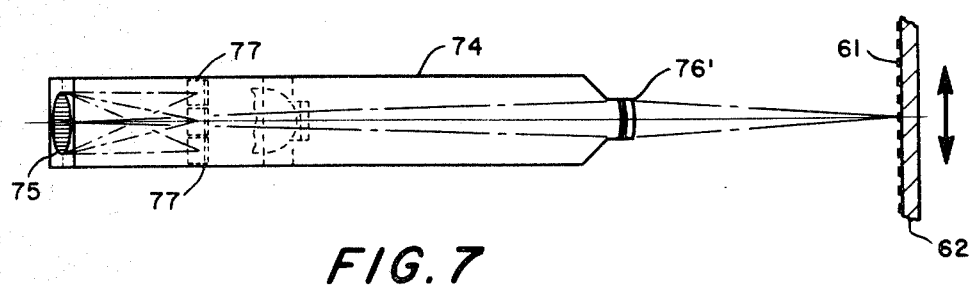
FIG. 7 is a view of the preferred embodiment of FIG. 6 taken along 7—7.

An embodiment of the present invention, shown in FIGS. 6 and 7, has been designed primarily for one-side operation, that is, to be used in conjunction with an opaque scale, such as a ruled steel tape. In this form, the device is adapted to modular construction for simple and rugged assembly at manufacture and requires minimum adjustment, such as disposition with respect to the scale, at the time of use in the field. Illumination module 60 and detector module 70 are designed for economical mass production and comprise bodies 64, 74 of transparent thermoplastic material which may be molded individually for later assembly, or may be manufactured as a single unit.

Illumination module 64 is of an optical quality acrylic plastic with accommodation for securing a light source, such as incandescent lamp 63, on the optical axis of molded lens portion 66. Detector module 70 is similarly molded from acrylic plastic with image-dividing surface 75 situated on the optical axis of molded lens portion 76. Accommodation is provided for mounting photo-electric cells 77 along the optical axis of the unit as displaced by dividing surface 75.

The scale employed in this embodiment comprises a steel tape 62 having disposed in regular array on one surface graduation indicia 61. These indicia are of a lateral width substantially equal to the space between indicia and establish a periodicity, $d$, of about 0.3mm in the longitudinal direction of the tape. This dimension has been found to be well within the tolerances which can be maintained in mass production.

Lens 66 of the illumination module 60 of the device is preferably of astigmatic, or toric, dimensions. The curvature of lens 66, as shown in FIG. 6, is preferably such as to image light source 63 at the scale indicia over a limited portion of the length of indicia 61. This limitation on the longitudinal dimension of the indicia image reduces the susceptibility of the system to errors occasioned by twist of the detection module about its optical axis. The second curvature of lens 66 is not shown in the present drawings, however, it is preferably of such greater radius as to focus the light from source 63 at a distance substantially equal to that between lenses 66, 76. In the course of its path in this second plane, the light beam illuminates a preselected plurality of scale graduation periods, approximately 12 in the present preferred embodiment.

Lens section 76 of detection module 70 is spherical in nature and of such dimensions as to image the illuminated portion of the scale indicia at dividing surface 75. In order to insure sufficient depth of focus to provide effective imaging over a significant portion of surface 75, for example, over at least 12 facet sets in this embodiment, the aperture of lens 76 is reduced as at 76' (FIG. 7).

Silicon photodiodes are employed as the photoelectric detectors 77 and are situated at the plane in which lens 76 is imaged by generally spherical reflective surface 75. In this manner the light directed upon the aperture of lens 76 by illuminator module 60 is directed at optimum intensity upon the plurality of photocells 77.

The modular construction of the preferred embodiment of the present invention permits inexpensive manufacture and assembly, and ensures practical alignment of the lens and reflector elements of the device. The final adjustment in the assembly of the device, that is, the positioning of the combined modules with respect to the scale may be readily accomplished in the field, and, due to the noted relationships between the individual elements of the modules, the positioning and assembly may be accomplished without excessive attention to otherwise critical placement of elements.

Figure 8:
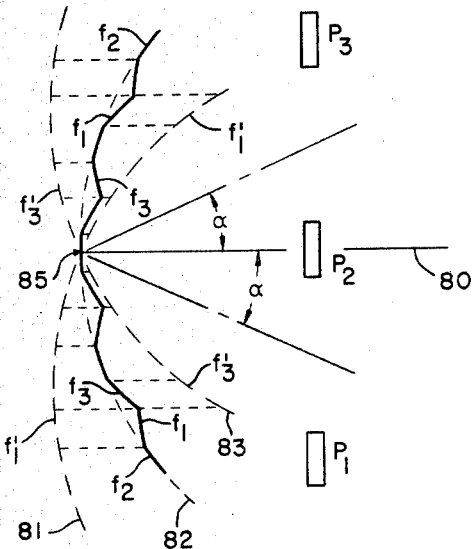
FIG. 8 is a schematic representation of a portion of a preferred image divider of the present invention.

The general structure of a preferred reflective image divider of the present invention is shown in FIG. 8 where surface 85 comprises a plurality of sets of facets $f_1$, $f_2$, $f_3$ which may, in essence, be individually considered as deriving from recurring sections taken from spherical surfaces 81, 82, and 83. These latter reference surfaces are of substantially equal radius and each is disposed with respect to optical axis 80 in such a manner as would direct light rays from lens 76 (FIG. 6) to each of the respective associated photocells $P_1$, $P_2$, $P_3$. For example, each of spherical surfaces 81, 83 is positioned with its respective optical axis shifted at an angle, $\alpha$, from the optical axis 80 of surface 82.

Actual dimensioning of surface 85 is accomplished by dividing the reference surfaces into the desired number of substantially equal sections and transferring selected sections in sequence to reference surface 82 to form the composite faceted reflecting image-divider 85. For example, as shown in FIG. 8, segments $f_1'$ of surface 81 are transposed to surface 82 where they constitute facets $f_1$. Similarly, segments $f_3'$ of surface 83 form facets $f_3$ of reflector 85. In practice, surface 85 forms the mold surface element for reflector 75 of detector module 70 (FIG. 6). Such a surface formed at the time of molding module 70 is subsequently silvered at the exposed outer surface to form the image-dividing reflector of the preferred embodiment of the present invention. Without such reflective silvering an appropriately dimensioned surface would provide the refractive image-divider earlier noted.

It should again be pointed out that the dimensions of the schematic drawings have been scaled in greatly exaggerated proportion for the purpose of clarity. For example, with respect to FIG. 8, the actual curvature of reference surface 82 over a practical plurality of facet sets, e.g., 12 sets as earlier described, would be such as to form a nearly flat image divider.

As can be seen from FIG. 6, a preferred arrangement embodying the present invention may result in a slight inclination of scale 62 with respect to the optical axis of imaging lens 76. However, by means of a compensating inclination in the disposition of image divider 75, this latter element may be readily located in the plane of best focus of the scale image. As an additional advantage in such an arrangement, the inclination of divider 75 allows an offset of photocell bank 77 and ensures an uninterrupted light path in module 70. Any variation in lateral dimension of the scale image as a result of the noted inclination of the image with respect to the scale may readily be compensated by the introduction of a similar dimension variation in the facets of image divider 75, e.g., as a tapering of the individual facets.

In operation, the present invention provides a series of phase-displaced electrical signals which may be used in known electronic counter and display devices, such as earlier noted, to yield directly, through appropriate calibration, indications of linear displacement in tooling or measuring apparatus. If desired, scales of angular dimension may be employed with the invention to provide direct read-out theodolites or angle measuring systems.

The foregoing description has been, for the most part, directed to embodiments of the invention which provide the highest degree of signal efficiency, such as where every optical element of a group constituting a periodic set in the image divider is capable of directing light to the respective photocells in the system, thus utilizing all available light in the scale image. It will be readily apparent, however, that some arrangements embodying the present invention might be constructed in such a manner as to include a substantially inactive optical element, for example an opaque facet, in each image divider set in order merely to obtain the basic assymetry of image period division necessary to establish signal phase relationships useful in directional counters. A system of this type could thus provide an effective device employing a pair of photocells where loss of light efficiency is a practical compromise to economy. In any event, such embodiments are nonetheless to be considered within the scope of the invention set forth in the following claims. What is claimed is:

1. In an electro-optic displacement measuring device comprising means for deriving a pattern of regularly varying light intensities from a scale element having a regular array of optically discernible indicia, said pattern being positionally displaced with displacement of said scale element; means for distributing said light pattern among a plurality of photocells variously positioned with respect to said light pattern so as to generate a plurality of electrical signals varying in predetermined phase relationship with said pattern displacement; and electronic counter means utilizing said plurality of signals to indicate the extent of said scale displacement; the improvement in said pattern-deriving and light-distributing means which comprises:

a. means for imaging a substantial number of indicia in said scale array at an image plane; and b. image-dividing and light-directing means comprising a multiplicity of contiguous reflective elements situated substantially at said image plane and arranged seriatim in the direction of periodicity of said scale image, said multiplicity of elements being further arranged in a sequence of groups wherein each group comprises a regular plurality of said elements and is of a dimension substantially equal to a period of said scale image, and respective elements in each group being arranged to direct incident light comprising said scale image to different respective ones of said plurality of photocells.

* * * * *